March 28, 1933. P. W. LEFFLAND 1,903,239
REAR AND PARKING VIEW ATTACHMENT
Filed July 9, 1929 4 Sheets-Sheet 4
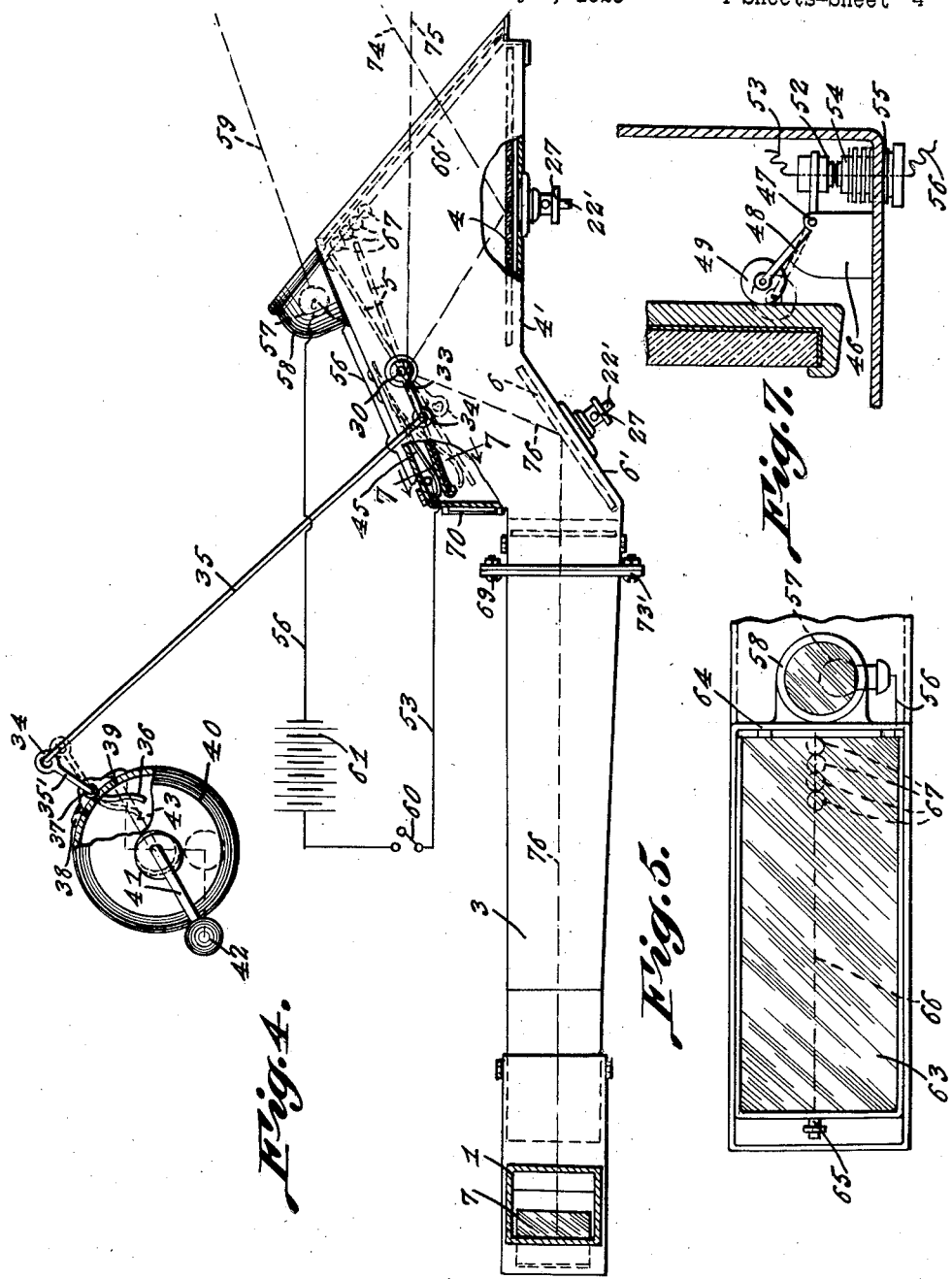
P. W. Leffland, INVENTOR
BY Victor J. Evans
and Co. ATTORNEYS Patented Mar. 28, 1933

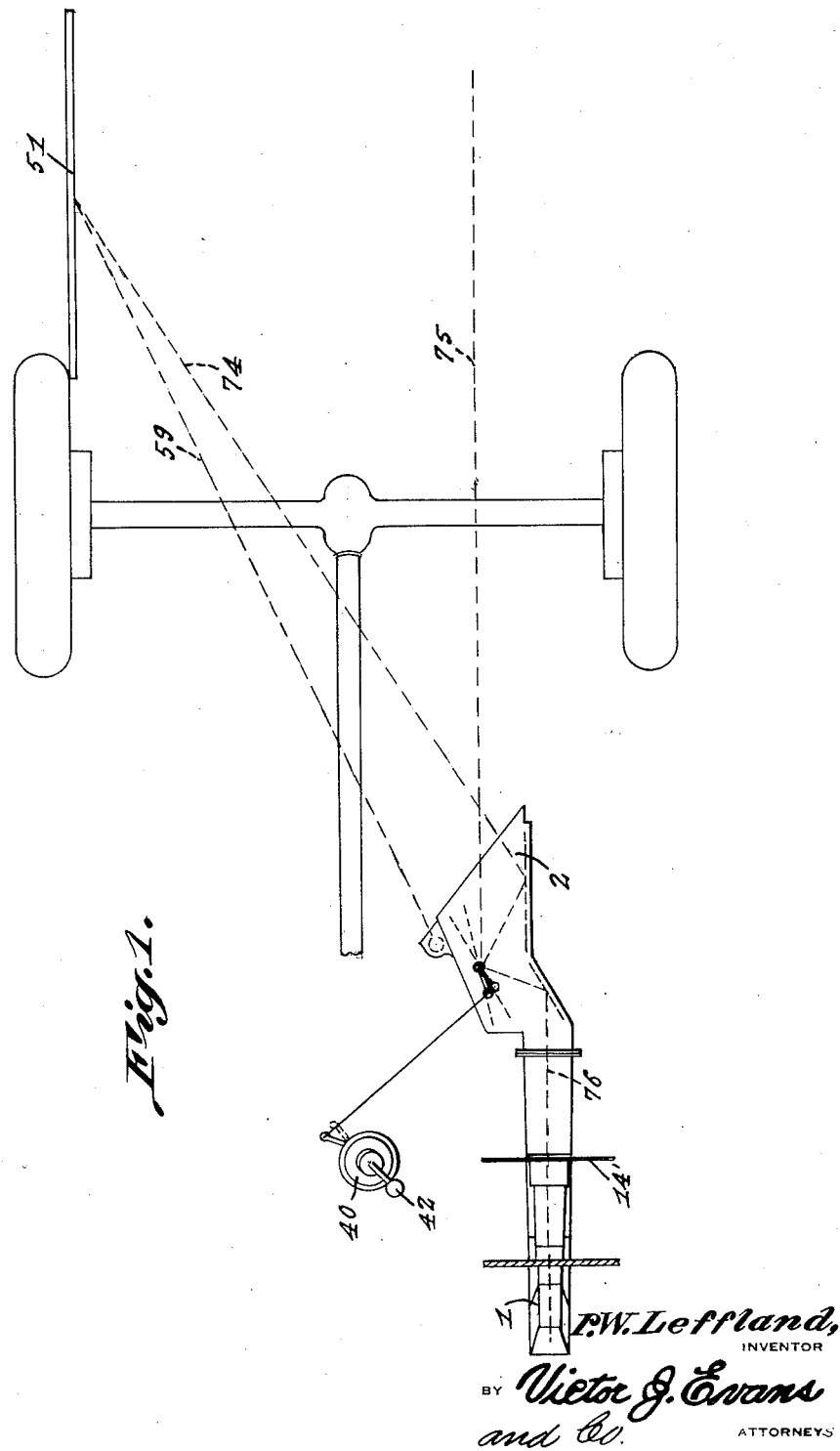

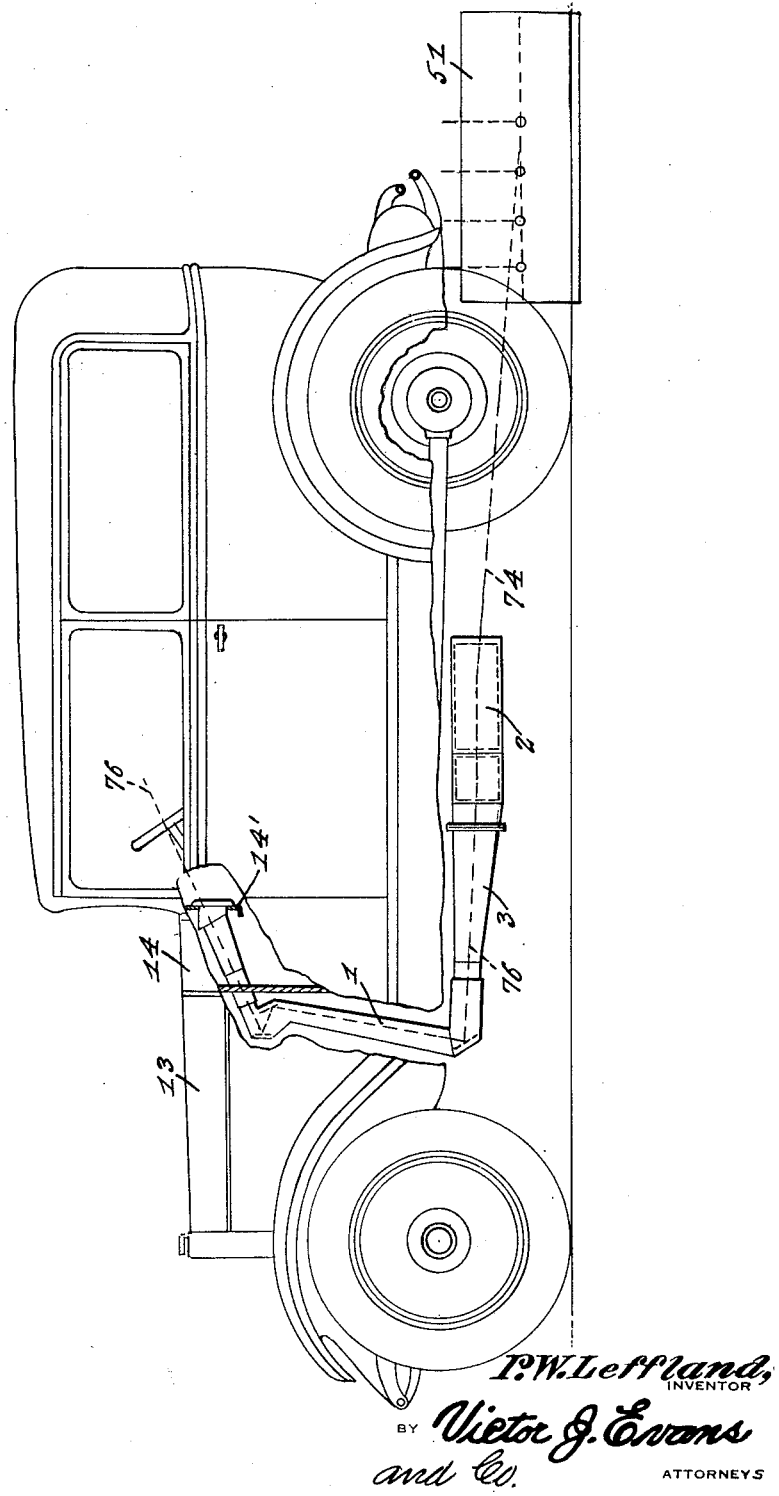

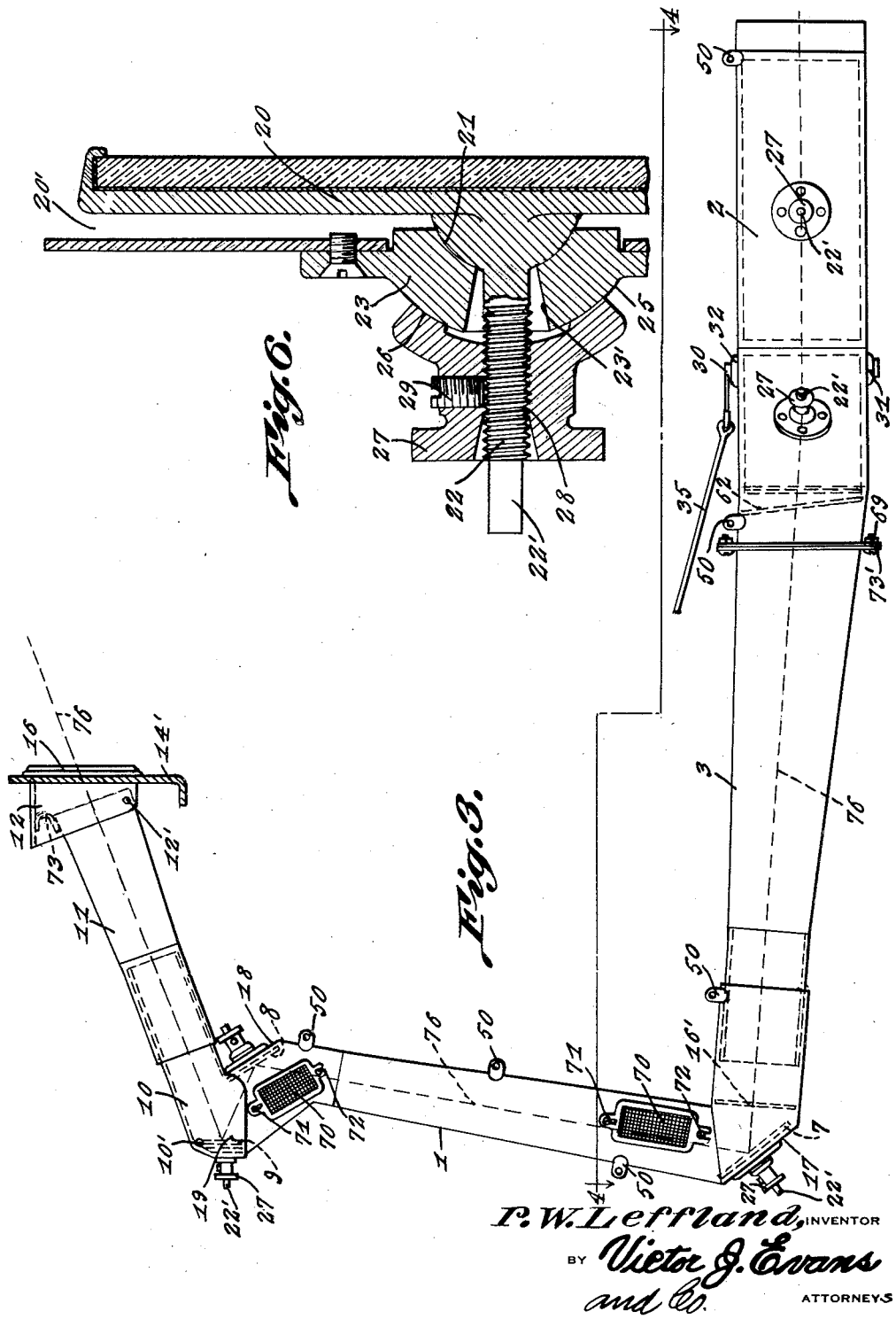

1,903,239

UNITED STATES PATENT OFFICE

PAUL W. LEFFLAND, OF ARLINGTON, TEXAS

REAR AND PARKING VIEW ATTACHMENT

Application filed July 9, 1929. Serial No. 376,979.

This invention relates to improvements in rear and parking view attachments for vehicles such as automobiles and which is especially convenient for the driver in that means are provided whereby he may gain an unobstructed view of the area in the direct rear of the vehicle and means being provided whereby he may gain another view of part of the right rear wheel of the vehicle and of the area in the direct rear of the said wheel thus enabling him to park the vehicle by knowing the distance of the right rear wheel from the curb or of another vehicle or object and enabling him to safely back the vehicle in a narrow driveway and at the same time observe the condition of the roadway at the rear of the vehicle while his head and eyes remain in a straight forward direction.

In the accompanying drawings:—

Figure 1 is a top plan view of the rear and parking view attachment indicating the position of the same when applied to an automobile machine.

Figure 2 is a side elevational view of the rear and parking view attachment showing the same applied to the body of an automobile machine with parts of the body of the machine broken away and parts shown in section.

Figure 3 is an enlarged side elevational view of the rear and parking view attachment detached.

Figure 4 is a horizontal sectional view of the attachment cut on the line 4—4 of Figure 3 and with parts broken away and parts shown in section.

Figure 5 is a rear end view of the attachment.

Figure 6 is an enlarged sectional view showing the detailed structure of a mirror mounting used in the attachment.

Figure 7 is an enlarged fragmentary sectional view cut on the line 7—7 of Figure 4.

The rear and parking view attachment includes a casing section 1 of metal having lugs 50 thereon whereby the said casing section may be mounted under the hood 13 of the automobile machine. The casing section 1 is provided with angularly disposed end portions and a mirror 7 is located in the casing section 1 and disposed across the apex of the angle between the intermediate portion and the end portion of said section. A similar mirror 8 is located in the upper end portion of the casing section 1. The casing section 1 is provided at its side with openings 70 and frames having fabric are placed over the openings 70 and secured to the casing section by means of screws 71 and 72. A transparency 16' is located in the lower portion of the casing section 1 and a casing section 3 is connected with the lower end of the casing section 1 by means of a slip joint connection. The casing section 2 is connected with the rear end of the casing section 3 by means of bolts 69 and nuts 73'.

The casing section 2 is provided with lugs 50 similar to the corresponding lugs mounted upon the casing section 1. A transparency 62 is located in the casing section 2 and a transparency 63 extends across the rear end of the casing section 2. A mirror 6 is mounted upon the wall 6' of the casing section 2 and a mirror 4 is mounted upon the wall 4' of the casing section 2. The walls 4' and 6' are disposed at an angle with relation to each other and a mirror 5 is pivotally mounted in the casing section 2 at the wall thereof opposite the walls 4' and 6'. A wire 66 is stretched across the transparency 63 and is fastened at its ends to a frame which is disposed around the transparency 63. The said frame is supported upon hinges 64 and a latch device 65 is provided for holding the frame closed at the rear end of the casing section. A series of balls 67 are slidably mounted upon the wire 66. The mirror 5 may be turned upon its pivot so that an object at the rear of an automobile machine may be seen along the line 75 and reflected from the face of the mirror 5 along the line 76 to the mirror 6 and from said mirror to the mirrors 7, 8 and 9. The mirror 9 is located in a casing section 10 which is pivotally connected with the upper end of the casing section 1 as at 10'. An extension section 11 is slidably connected with the upper end of the slip joint connection. A frame 12 is pivotally connected by means of a pivot 12' with the upper end of the extension section 11 and the frame 12 passes through the instrument board 14'. A transparency 16 is located at the end of the frame 12 and at the inner side of the instrument board 14'. A spring member 73 is mounted upon the upper end of the section 11 and presses against the top wall of the frame.

When the mirror 9 is turned to one position an object appearing upon the face of the mirror 4 and along the line 74 is reflected to the face of the mirror 6 and the reflection may be observed along the line 76 hereinbefore described. The line 74 leads to a point at the rear of the right rear wheel of the automobile machine. A lamp casing 58 is located at the side of the casing section 2 and a lamp bulb 57 is located in the casing 58 and arranged to cast a beam of light along the line 59 which converges with the line 74 at a point behind the right rear wheel of the machine as indicated at 51 in Figure 1 of the drawings. The balls 67 may be spread apart upon the wire 66 and across the transparency 63 and thus serve as means for indicating the distance from the right rear wheel back to an object behind the said wheel. A battery 61 is connected by means of a wire 56 with the bulb 57 and the battery 61 is connected with a switch 60, the said switch in turn being connected by means of a wire 53 with a circuit closer 52. The wire 56 connects with a plug 54 which is secured in the casing section 2 as at 55. An arm 48 is pivotally mounted upon a lug 46 behind the mirror 5 and when the mirror 5 is swung a roller 49 journaled at the end of the arm 48 moves along the back of the mirror. Consequently the circuit closer 52 is moved into engagement with the plug 54 and the circuit from the battery to the lamp bulb is closed when the switch 60 is closed. When the roller 49 is at its highest point it serves as a stop for checking the movement of the mirror 5. The mirror 5 is mounted upon a shaft 30 which is journaled in the casing section 2 and which is provided at its upper end with a crank arm 33. A rod 35 is connected at one end with the crank arm 33 as at 34 and the other end of the rod is connected with a crank arm 35'. The crank arm is pivotally mounted as at 37 in a lug 38 attached to the side of the casing 40 by means of screws 39.

The casing 40 is the same as a gear shift housing generally used upon automobile machines. The free end of the crank arm 36 is located in the path of movement of the end 43 of a lever 41. The lever 41 is the usual shift lever. When the lever 41 is swung by using the handle 42 thereof the crank arm 35' is rocked whereby the rod 35 is moved longitudinally and through the crank arm 33 the mirror is turned upon its pivot to a stop position determined by the roller 49 and the adjustment as at 55. A spring 45 is located behind the mirror 5 and bears against the back of the said mirror and holds the mirror at a position to secure a view along the lines 75.

The extension section 11 is located under the cowl 14 of the automobile machine as best shown in Figure 2 of the drawings. The mountings of the mirrors 4, 6, 7, 8 and 9 are all alike and a description of one will answer for all. The mounting is best shown in Figure 6 of the drawings. Each mounting consists of a plate 20 which supports the mirror. The plate is provided at its rear side with a globular head 21 which is received in a socket member 23 attached to the adjacent wall of the section as at 20'. The socket member 23 is provided with a central opening 23' and a convexed rear surface 25 which bears upon a concaved surface 26 of a nut 27. The nut 27 is screwed upon the thread 22 of a shaft 22' attached to the globular head 21. The thread 22 engages the thread 28 of the nut and a set screw 29 passes through the nut and engages the thread of the shaft 22'. It is apparent that by loosening the nut 27 the mirror plate 20 may be adjusted to a desired angle with relation to the wall of the casing section to which the mirror is attached and when the nut 27 is tightened the mirror is held at the desired adjusted position.

I claim:

1. In combination an attachment for vehicles for presenting to the driver at the juncture of the attachment with the instrument board of said vehicle, either of two views, thru the attachment which is in the form of two relating cases, one of said views including a desired area in the direct rear of said vehicle, and presenting, upon adjustment of a movable mirror disposed in the rearmost of said cases, a new view including a portion of the right rear wheel of said vehicle and an area directly behind said wheel, said cases having clips for attachment to the said vehicle, one of said cases being disposed on said vehicle forwardly of the vehicle instrument board, the lower portion of the case being approximately horizontally disposed below the vehicle frame, and the major portion of said case integrally conjuncting forwardly of the lower portion and disposed upwardly and rearwardly, and a relatively short portion integrally conjuncting with the upper end of said major portion and disposed upwardly and forwardly and a relatively longer portion conjuncting forwardly of the short portion and disposed upwardly and rearwardly and designed to attach to the vehicle instrument board, said case being glazed at this attachable end and at the opposing end with clear plate glasses, and the said case having disposed in its interior a flat-faced mirror at each of said three junctures, said mirrors being reflectively related one to the other in order to carry views thru the length of said case to the juncture at the instrument board, said views being received by the lowermost mirror thru the lower approximately horizontal end of said forward case from said relating case containing reflectively related mirrors.

2. In combination an attachment for vehicles for presenting to the driver at the juncture of the attachment with the instrument board of said vehicle, either of two views, thru the attachment which is in the form of two relating cases, and a connecting case open at both ends, one of said views including a desired area in the direct rear of said vehicle, and presenting, upon adjustment of a movable mirror disposed in the rearmost of said cases, a new view including a portion of the right rear wheel of said vehicle and an area directly behind said wheel, said cases having clips for attachment to the said vehicle, one of said cases being disposed on said vehicle forwardly of the vehicle instrument board, the lower portion of the case being approximately horizontally disposed below the vehicle frame, and the major portion of said case integrally conjuncting forwardly of the lower portion and disposed upwardly and rearwardly, and a relatively short portion integrally conjuncting with the upper end of said major portion and disposed upwardly and forwardly and a relatively longer portion conjuncting forwardly of the short portion, and at said juncture two identical side walls of the short portion projecting upwardly and lapped by two identical side walls projecting downwardly from the upper portion, presenting attachable surfaces for a thru pin whereby the upper portion of the case is vertically adjustable with reference to the case proper, the said upper portion being disposed upwardly and rearwardly and being adjustable both in length and with relation to the vehicle instrument board, which it is designed to project thru and attach to, said case being glazed at this attachable end and at the opposing end with clear plate glasses, and the said case having disposed in its interior a flat-faced mirror at each of said three junctures, said mirrors reflectively related one to the other in order to carry views thru the length of said case to the juncture at the instrument board, said views being received by the lowermost mirror, thru the lower approximately horizontal end of said forward case from said relating case containing reflectively related mirrors, the said lower part of the forward case being of proper girth and length to slidably receive an adjustable depending and connecting case, said case being open at either end and being attachable to said rearward relating case by a continuous outturned flange on each of the said cases.

3. In combination an attachment for vehicles for presenting to the driver at the juncture of the attachment with the instrument board of said vehicle, either of two views, thru the attachment which is in the form of two relating cases, one of said views including a desired area in the direct rear of said vehicle, and, upon adjustment, presenting a new view, including a portion of the right rear wheel and an area directly behind said wheel, one of said cases being attachably arranged forwardly of the vehicle instrument board, said case containing mirrors reflectively related one to the other and related to the juncture of said case at said instrument board, the lowermost of said mirrors being reflectively related thru an end of said case to a mirror in said relating case, said case being detachably arranged on said vehicle rearwardly of this case and having disposed rearwardly in it a flat-faced mirror of sufficient size to properly include a view to a second flat-faced mirror spaced apart from said first mirror, said view being thru a rearwardly glazed end of said rearward case of a portion of the right rear vehicle wheel and an area to the rear of same, said second mirror having spaced apart from same a third mirror being reflectively disposed in said case in order to carry the view thru a glazed forward end of the case to said lowermost mirror in the said forward case, the said first and third mirrors in the rearward case being adjustably connected to the case and the second mirror being pivotally mounted at the center of the mirror face on a vertical shaft, the major portion of the shaft being disposed behind the frame of said mirror and said shaft being removably connected to the top and bottom of the case, having mounted upon its upper end an arm, a rod connecting the arm, the opposing end of said rod being connected to another arm, curved at its opposing end, the curved end designed to be disposed in the vehicle gear shifting housing by virtue of a ball integral with said arm at its center, being contained in a ball case detachably mounted on said gear shifting housing at a proper point to insure the shifting of the said second mirror to a reflective relation to the first mirror by manual operation of the vehicle shift lever to the well known reverse position, said second mirror having a spring so attached to swing said mirror, at such times that the shift is not in reverse, to a new position and not reflectively related to said first mirror but to reflect to the third mirror a desired view of the direct rear of said vehicle.

4. A rear view attachment for an automobile machine comprising a series of casing sections connected together and disposed at angles with relation to each other, the initial casing sections extending forwardly from the instrument board of the automobile machine and the terminal casing section being located under the body of the machine and disposed rearwardly, mirrors located in the casing sections and disposed across the apices of the angles, a mirror pivotally mounted in the terminal casing section and manually operable means for turning the last mentioned mirror upon the pivot.

5. A rear view attachment for an automobile machine comprising a series of casing sections connected together and disposed at angles with relation to each other, mirrors located in the casing sections and disposed across the apices of the angles, a mirror pivotally mounted in the terminal casing section, manually operable means for turning the last mentioned mirror upon the pivot, an electric lamp mounted upon the terminal section and connected in opened circuit with a source of electric supply and a switch adapted to be operated by the movement of the last mentioned mirror to close said circuit.

6. A rear view attachment for an automobile machine comprising a series of casing sections connected together and disposed at angles with relation to each other, mirrors located in the casing sections and disposed across the apices of the angles, a mirror pivotally mounted in the terminal casing section and adapted to swing transversely thereof and elements mounted at the rear end of the terminal casing section and adapted to be adjusted across the said casing section to gauge the pivotal movement of the mirror.

7. A rear view attachment for an automobile machine comprising a series of casing sections connected together and disposed at angles with relation to each other, means for ventilating the interior of the casing sections, mirrors located in the casing sections and disposed across the apices of the angles, a mirror pivotally mounted in the terminal casing section and manually operable means for turning the last mentioned mirror upon the pivot.

8. A rear view attachment for an automobile machine comprising a series of casing sections connected together and disposed at angles with relation to each other, the initial casing section having pivotal connection with the intermediate casing section, mirrors located in the casing sections and disposed across the apices of the angles, a mirror pivotally mounted in the terminal casing section and manually operable means for turning the last mentioned mirror upon the pivot.

9. A rear view attachment for an automobile machine comprising a series of casing sections connected together and disposed at angles with relation to each other, the terminal casing section having slip joint connections with the intermediate casing section, mirrors located in the casing sections and disposed across the apices of the angles, a mirror pivotally mounted in the terminal casing section and manually operable means for turning the last mentioned mirror upon the pivot.

10. A rear view attachment for an automobile machine comprising a series of casing sections connected together and disposed at angles with relation to each other, the initial casing sections having pivotal connection with the intermediate casing section, the terminal casing section having slip joint connections with the intermediate casing section, an extension section having slip joint connections with the initial casing section, a transparency closing the end of the extension section, a transparency closing the end of the terminal section, means mounted upon the intermediate section for ventilating the interior of all of the sections, mirrors located in the casing sections and disposed across the apices of the angles, a mirror pivotally mounted in the terminal casing section and manually operable means for turning the last mentioned mirror upon the pivot.

In testimony whereof I affix my signature.

PAUL W. LEFFLAND.